(No Model.)
2 Sheets—Sheet 1.

W. O. COLEMAN.
SEED COTTON SEPARATOR AND CLEANER.

No. 281,671. Patented July 24, 1883.

WITNESSES
S. G. Nottingham
Geo. F. Downing

INVENTOR
W. O. Coleman
By his Attorney (No Model.) 2 Sheets—Sheet 2.
W. O. COLEMAN.
SEED COTTON SEPARATOR AND CLEANER.
No. 281,671. Patented July 24, 1883.
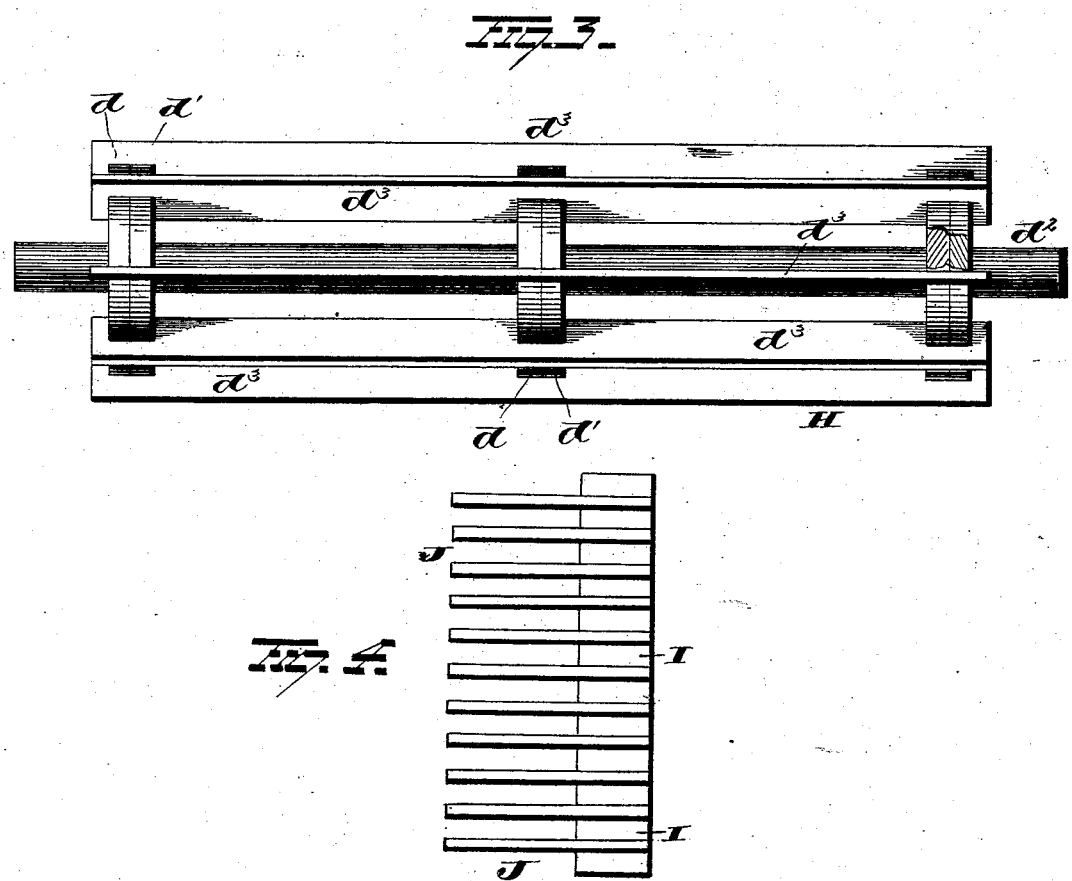
WITNESSES
S. G. Nottingham
Geo. F. Downing
INVENTOR
W. O. Coleman
By H. A. Seymour
Attorney

UNITED STATES PATENT OFFICE.

WILLIAM O. COLEMAN, OF MEMPHIS, TENNESSEE.

SEED-COTTON SEPARATOR AND CLEANER.

SPECIFICATION forming part of Letters Patent No. 281,671, dated July 24, 1883.

Application filed November 4, 1882. (No model.)

*To all whom it may concern:*

Be it known that I, WILLIAM O. COLEMAN, of Memphis, in the county of Shelby and State of Tennessee, have invented certain new and useful Improvements in Seed-Cotton Separators and Cleaners; and I do hereby declare the following to be a full, clear, and exact description of the invention, such as will enable others skilled in the art to which it pertains to make and use the same.

My invention relates to an improvement in seed-cotton separators and cleaners, the object of the same being to provide a machine of few parts that will clean and separate seed-cotton from intimately-mixed bolls and trash that have been gathered therewith; and with these ends in view my invention consists in certain details of construction and combinations of parts, as will be more fully described, and pointed out in the claims.

Figure 1:
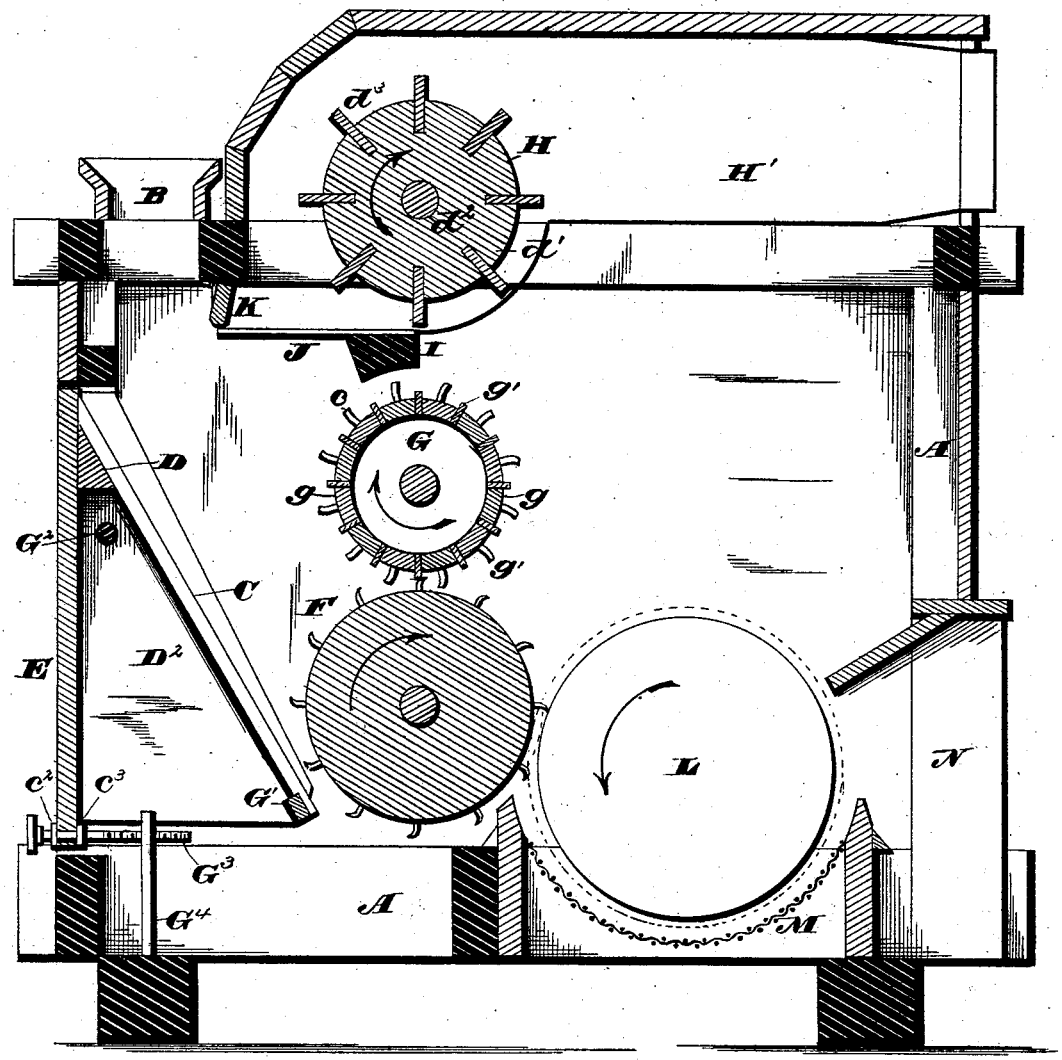
Figure 2:

Figure 1 of the accompanying drawings represents a longitudinal vertical sectional view of my improved separator. Fig. 2 is a view of a tooth of the separating-cylinder. Fig. 3 is a perspective view of the fan. Fig. 4 is a detached view of the grating $g$.

A represents the frame of the machine, provided with the receiving-hopper B, into which the seed-cotton and intimately-mixed twigs, bolls, and hulls are thrown by hand or by any suitable feeding-machine adapted for the purpose. The seed-cotton, with its intimately-mixed trash, falls from the hopper onto the adjustable inclined grating C, which latter is situated immediately under the said hopper, and is adapted to deliver the seed-cotton, with its mixed trash, directly on the separating-cylinder. This grating C consists of a series of grate-bars made of metal or wood, separated sufficiently to allow twigs, dirt, &c., to fall through, but not enough to afford an escape for any seed-cotton. The opposite ends of the grate-bars C are secured to the transverse braces D and G', which latter are in turn secured, respectively, to the upper and lower ends of the triangular brackets $D^2$, while the front board, E, is secured to the front faces or edges of the said brackets. This front board, grate-bars, braces, and brackets are loosely hung in the machine, in the position shown, by the horizontal rod $G^2$, which latter passes through the brackets below the upper brace, D, and the ends thereof are secured in any suitable manner to the machine-frame. This leaves the grating with the front board and intermediate parts free to be moved inward and outward; but this movement is controlled by the regulating-screw $G^3$, which latter is held against longitudinal movement in the front board, E, by the shoulders $c^2$ and $c^3$. The screw-threaded inner end of the screw $G^3$ passes through the rigid metallic strip $G^4$, or its equivalent, and as the screw is turned the lower end of the grating is moved nearer to or farther away from the separating-cylinder, as circumstances demand.

When the cotton, with its mixed impurities, is fed into the hopper, it falls therefrom onto the grating and slips or rolls downward thereon until it meets the separating-cylinder F. During this movement of the cotton it is somewhat loosened and a portion of the loose sand, leaves, twigs, &c., escapes therefrom, and either falls downward between the grate-bars or is drawn upward by the fan H or escapes between the cylinder F and the grating C. The separating-cylinder F is situated in close proximity to the grating, and is adapted to take the seed-cotton, with its mixed impurities, therefrom as it is fed from the hopper, a sufficient space, however, between the grating and separating-cylinder being left through which any loose bolls or other foreign matter can escape before reaching the separating-cylinder. This separating-cylinder is either provided with a series of circular saws having hooked teeth, similar to those employed in saw-gins, or can be made by driving sharp-pointed nails or spikes in a wooden cylinder with the sharp points out and bent to form hooked teeth, (shown in Fig. 2,) similar to those on a gin-saw. In this latter instance the rows of teeth would be placed about one-half an inch apart on the circumference of the cylinder and in circumferential rows about three-fourths of an inch apart, so as to form series of teeth similar to the ordinary saw-cylinder, while in the first instance the saws are placed about three-fourths of an inch apart. In either of the above cases the cotton, as it falls down the inclined grating, is taken up by the teeth and carried upward and partly over the cylinder until it comes in contact with the hulling-cylinder G, which latter is situated nearly in the same vertical plane with the separating-cylinder F. This cylinder G is about the same size as the separating-cylinder, revolves in an opposite direction therefrom at point of contact, and is adapted to knock back all bolls, twigs, &c., that have been taken up by the saws or teeth of the separating-cylinder. The hulling-cylinder G is composed of a number of wooden strips, $g$, formed in the arc of a circle, and secured either on a hollow or solid wooden cylinder or to wooden or metallic heads in any desired manner.

$g'$ are sheet-metal strips interposed between the strips $g$, and adapted to project outward beyond the convex surfaces of said strips, so as to act on the seed-cotton as it passes around on the separating-cylinder. Each strip $g$ is provided with one or more rows of curved teeth or spikes, $c$, adapted to work between the saws or teeth of the separating-cylinder and knock back all bolls, twigs, &c., between the saws or teeth, while the metallic strips $g'$ are adapted to work over the saws or teeth and remove all foreign particles adhering to the cotton on the side next to the hulling-cylinder. The bolls and twigs, together with the adhering seed-cotton that is knocked backward from the separating-cylinder, fall onto the grating C with considerable force, which loosens the mass and allows the dirt and sand contained therein to either fall through the grating or be drawn upward into the dust-flue H' by the fan H. If the foreign matter, instead of being knocked off by the hulling-cylinder, should adhere to the teeth of the said hulling-cylinder, it is carried thereby until it meets the stationary clearer I. This clearer is rigidly secured to the frame in a position directly over the hulling-cylinder. As the hulls and other foreign matter are carried upward they suddenly come in contact with the rigid clearer I, which releases them from the teeth and allows them to fall backward onto the grating C. J are metallic or wooden grate-bars secured to the clearer I, and adapted to cover the inner opening of the dust-flue and prevent the seed-cotton from being drawn outward by the air-blast.

K is a hinged door or partition adapted to cover the opening between the outer ends of the grate-bars J and the top of the machine-frame and prevent the escape of any cotton. When it is desired to clear the grating J of any matter collected thereon, it is simply necessary to raise the door, which offers free access to the fan-chamber.

The fan H consists of two or more circular heads, $d\ d'$, rigidly secured to a metallic shaft, $d^2$, and metallic or wooden strips $d^3$, secured in recesses formed at suitable intervals apart in the peripheries of the heads. The heads $d\ d'$ are preferably made of wood, and each is composed of two disks glued or otherwise secured together, with their grains running in contrary directions, so as to prevent them from splitting or warping. These heads are rigidly secured on the shaft, about ten or twelve inches apart, and each head is provided with recesses, into which the metal or wooden fan-strips $d^3$ are placed and secured by glue or screws. This construction of fan is simple and durable, and can be manufactured at a small cost.

The cotton, that adheres to the teeth of the separating-cylinder during its operation and passes beyond the hulling-cylinder, is carried by the said separating-cylinder around to the stripping-cylinder L, which latter runs at a faster rate of speed than the separating-cylinder. This cylinder L is made of wood, and is provided with alternating or broken rows of teeth, (not shown in the drawings,) adapted to run between the rows of saws or teeth of the separating-cylinder and remove all the adhering seed-cotton therefrom. A wire screen, M, is situated immediately under this cylinder, and the cotton, as it is torn from the teeth of the separating-cylinder, is carried over the screen M by the teeth of the stripping-cylinder. Cylinder L revolves in the same direction at the point of contact as the separating-cylinder, and moves about five times as fast. When the rows of teeth or pins of the cylinder L are continuous or unbroken, the cotton is moved over the screen M without being agitated or changing its position; but when the rows are broken or alternately arranged, as previously described, the cotton is loosened and torn apart, which frees what sand and leaves remain therein and allows them to fall through the screen. The cotton is carried upward by this stripping-cylinder until the discharge-spout N is reached, into which the thoroughly-cleaned and separated seed-cotton is discharged. Suitable means for conveying this cleaned seed-cotton direct to a gin can be devised, or it can be delivered on a floor and afterward fed to the gin, as desired.

My invention is simple in construction, is of few parts, is durable in use, and effectively cleans the cotton of all impurities before ginning.

It is evident that slight changes in the construction and relative arrangement of the several different parts might be resorted to without departing from the spirit of my invention; and hence I would have it understood that I do not limit myself to the exact construction shown and described, but consider myself at liberty to make such changes and alterations as come within the spirit and scope of my invention.

Having fully described my invention, what I claim as new, and desire to secure by Letters Patent, is—

1. In a machine for cleaning and separating seed-cotton, the combination, with a receiving-hopper and the separating-cylinder, of a series of grate-bars secured to an adjustable frame and situated immediately under the hopper, and adapted to deliver the seed-cotton as it falls from the hopper to the separating-cylinder.

2. The combination, with the adjustable grating and separating-cylinder, of a hulling-cylinder situated above the separating-cylinder and provided with spikes adapted to work between the teeth or saws of the separating-cylinder, substantially as set forth.

3. The combination, with the separating-cylinder and inclined grating, made adjustable so as to increase or diminish the space between the said cylinder and grating, of a hulling-cylinder provided with spikes, the latter being secured to the cylinder and adapted to work between the saws or teeth of the separating-cylinder.

4. The combination, with the inclined grating and separating and hulling cylinders, of the rigid clearer situated over the hulling-cylinder, substantially as and for the purpose set forth.

5. The combination, with the adjustable grating C, separating and hulling cylinders, and the rigid clearer I, of the grating J and fan H, all of the above parts constructed, combined, and adapted to operate as described.

6. The combination, with the grating C, grating J, and intermediate mechanism for separating and cleaning seed-cotton, of the hinged door K and fan H, all of the above parts combined and adapted to operate as described.

7. The combination, with the adjustable grating, separating and hulling cylinders, a rigid clearer, and fan, of the stripping-cylinder and wire screen M, all of the above parts combined and adapted to operate as described.

8. The combination, with a separating-cylinder provided with teeth, of a hulling-cylinder composed of the curved wooden strips, the metallic strips, and spikes or teeth.

9. The combination, with the inclined grating, front board, the triangular side pieces, and the pivoted rod, of the adjusting-screw and strip $G^4$, all of the above parts combined and adapted to operate as described.

10. In a machine for separating and cleaning seed-cotton, the combination, with the receiving-hopper and adjustable grate-bars, of the separating-cylinder situated near the lower ends of the grate-bars, and provided with teeth adapted to engage the seed-cotton and carry it upward away from the grate-bars, all of the above parts combined and adapted to operate as described.

In testimony whereof I have signed this specification in the presence of two subscribing witnesses.

WILLIAM ORSBERN COLEMAN.

Witnesses:
T. B. RAWLINGS,
LEWIS TURNEY.